United States Patent [19]

Sato

[11] Patent Number: 5,311,316
[45] Date of Patent: May 10, 1994

[54] ON-SCREEN DISPLAYING APPARATUS HAVING ZOOM FUNCTION

[75] Inventor: Masayori Sato, Saitama, Japan

[73] Assignee: Kabushiki Kaisha Toshiba, Kawasaki, Japan

[21] Appl. No.: 942,608

[22] Filed: Sep. 10, 1992

[30] Foreign Application Priority Data

Sep. 18, 1991 [JP] Japan .................................. 3-238366

[51] Int. Cl.⁵ ...................... H04N 5/262; H04N 5/272; H04N 5/460
[52] U.S. Cl. .................................... 348/584; 358/231; 348/204; 348/745
[58] Field of Search ................ 358/183, 22, 180, 181, 358/230, 236, 231, 225, 188, ; H04N 5/262, 5/272, 3/223, 9/74, 450, 445

[56] References Cited

U.S. PATENT DOCUMENTS

| | | | |
|---|---|---|---|
| 4,231,066 | 10/1980 | Merchant | 358/225 |
| 4,527,201 | 6/1985 | Cappels | 358/224 |
| 4,722,007 | 1/1988 | Fling | 358/180 |
| 4,843,475 | 6/1989 | Imai | 358/180 |
| 4,864,405 | 9/1989 | Chambers | 358/230 |

FOREIGN PATENT DOCUMENTS

| | | | |
|---|---|---|---|
| 179080 | 12/1988 | Japan | H04N 5/278 |
| 120595 | 4/1989 | Japan | H04N 5/445 |
| 223286 | 9/1990 | Japan | H04N 5/45 |
| 4322574 | 11/1992 | Japan | H04N 5/278 |

OTHER PUBLICATIONS

Television Gijutsu, Jun. 1991, pp. 26–32.

*Primary Examiner*—James J. Groody
*Assistant Examiner*—Glenton B. Burgess
*Attorney, Agent, or Firm*—Cushman, Darby & Cushman

[57] ABSTRACT

A projection type imaging display system utilizing a liquid crystal panel projector. The zoom position of a projection lens is detected as an indicator of the aspect ratio of the main image being projected. Based on the zoom position, the position of an information display signal superimposed upon the main image is adjusted relative to the position of the main image, so that the information display signal is displayed on the main image no matter what the aspect ratio of the main image is.

4 Claims, 9 Drawing Sheets

FIG. 2(a) NORMAL STATE
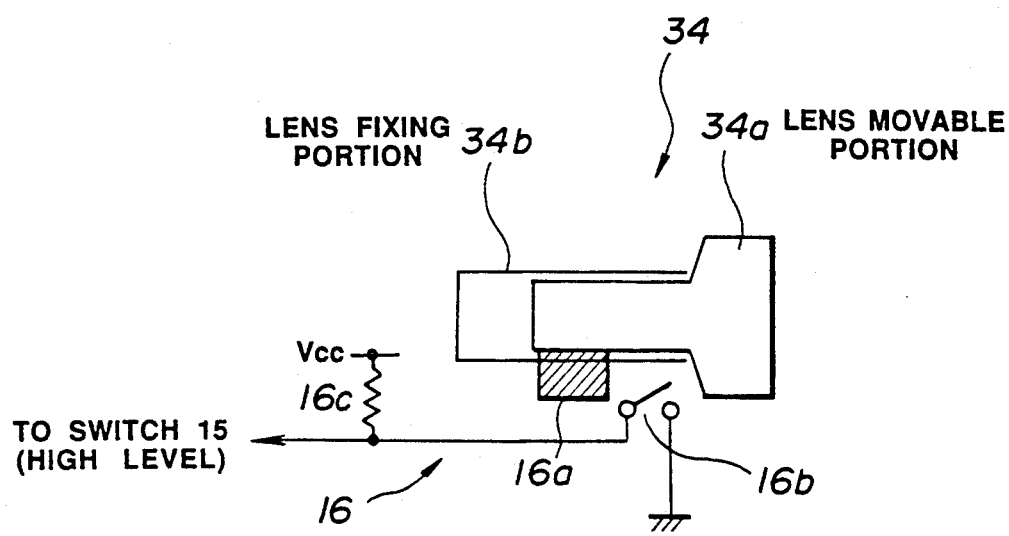
FIG. 2(b) ZOOMING STATE
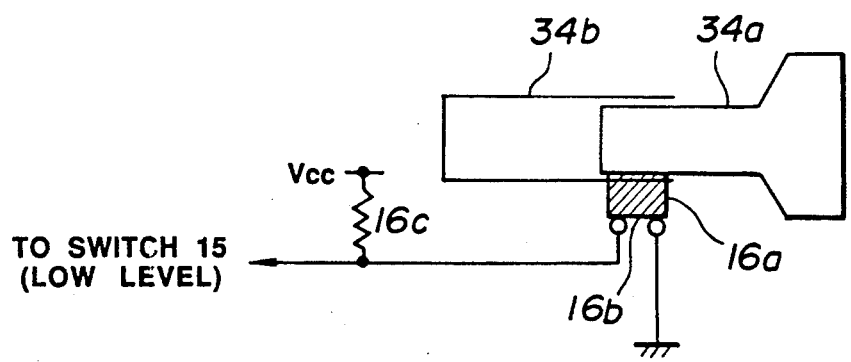

IN THE CASE OF 16:12

IN THE CASE OF 16:9

IN THE CASE OF 16:12

IN THE CASE OF 16:9

ON-SCREEN DISPLAYING APPARATUS HAVING ZOOM FUNCTION

BACKGROUND OF THE INVENTION

1. Field of the Invention

The present invention relates to an image projection device capable of super-imposing an on-screen information display onto the main image being projected. In particular, the invention provides for an image projecting apparatus including an on-screen displaying circuit capable of adjusting a location of a superimposed image in response to varying aspect ratios of the main image being projected.

2. Description of the Related Art

A liquid crystal projector has lately attracted considerable attention. To obtain a large-sized image, a halogen lamp or the like emits light from the rear of a liquid crystal panel. Thereby, an image on the liquid crystal display is enlarged and projected onto a front screen through a projection lens. The advantages this structure is that the liquid crystal display is small and light, yet the size of a picture image can be easily enlarged by the scale factor of the projection lens. Therefore, a television apparatus capable of obtaining a large-sized picture image from a small and light weight device can be developed.

Since the liquid crystal projector is a kind of television receiver, a receiving circuit has been developed which is capable of displaying additional information such as a channel display, an image menu display and a picture in picture display.

FIG. 10 is a block diagram showing an on-screen displaying circuit in, use. The circuit illustrates a circuit formation which determines a display position of an on-screen signal in the vertical direction when the on-screen signal is displayed on a television picture plane. In FIG. 10, a counter 31 is operated by inputting a horizontal synchronizing signal HD into a display position circuit as a clock pulse, and using a vertical synchronizing signal VD as a reset pulse, a display position timing pulse is produced which corresponds to a display position of the on-screen signal. Input ends d and e of a switch 32 are selectively changed over using this display position timing pulse, so that an output video signal in which an on-screen signal is superimposed will be obtained and supplied to a displaying device 33 composed of a liquid crystal panel and a cathode ray tube. The image on which the on-screen information is superimposed is displayed by the displaying device 33. In a projecting-type television receiver, the image displayed on the displaying device 33 is further enlarged and projected on a screen 35 through a projection lens 34.

FIG. 11 shows a timing of a signal for each portion of FIG. 10. In FIG. 11, (a) and (b) represent a horizontal synchronizing signal HD and a vertical synchronizing signal VD supplied to the counter 31, respectively. Also, (c) represents counter output (that is, a display position timing pulse) which is output when a predetermined number (the number of n) of the horizontal synchronizing signals HD are counted after the counter 31 is reset by a trailing edge of the vertical synchronizing signal VD. (d) and (e) represent a video signal and an on-screen signal supplied to two input ends d and e of the switch 32, respectively. A video signal on which an on-screen signal is selectively superimposed, as shown in (f), is output from the switch 32.

In our highly oriented information age, it has been desired to increase the aspect ratio of video software from 16:9, as represented Hi-Vision broadcast size, a Cinema Scope size or a vista size, to an aspect ratio of 16:12 (=4:3). In current video software, for example as shown in FIGS. 12(a) and 12(b), if a zoom ratio of a projection lens of a liquid crystal projector is changed, an image having the ratio 16:9 can be projected to fill the screen 35. FIG. 12(a) represents a case in which a liquid crystal picture image having the ratio 16:12 is enlarged and displayed on the screen 35, also having the ratio 16:12. FIG. 12(b) represents a case in which a picture image having the ratio 16:9, such as a Hi-Vision broadcast, is displayed on the liquid crystal picture plane having the aspect ratio 16:12 and enlarged and displayed on the screen 35 having the ratio 16:9.

In this case, as shown in the timing chart of FIG. 11; a display position of an on-screen signal is determined regardless of the contents of a video software. Therefore, as shown in FIG. 13(a), there is no problem in the case when an on-screen display is superimposed onto the liquid crystal picture image having the aspect ratio 16:12 and enlarged and displayed on the screen 35 having the same aspect ratio 16:12. However, as shown in FIG. 13(b), a part of the superimposed on-screen display will be projected off of the projection screen 35 when a picture image having the aspect ratio 16:9 is displayed on the liquid crystal picture plane having the aspect ratio 16:12 and enlarged and displayed on the screen 35 having the aspect ratio 16:9. As a result, not all of the superimposed on-screen information will be displayed proper.

The size of a picture image can be easily changed by a zoom ratio of a projection lens in a projecting-type image displaying apparatus, such as a liquid crystal projector. However, it is inconvenient that a superimposed on-screen display goes beyond a projection screen as the size of a picture image is determined in accordance with the video software.

SUMMARY OF THE INVENTION

The object of the present invention is to provide an on-screen displaying circuit which can project a superimposed on-screen display within the dimensions of a projection screen regardless of a zoom ratio used by projecting-type image displaying apparatus.

In other words, the on-screen displaying circuit of the present invention comprises changing over means for selectively outputting an on-screen signal in a predetermined period within a video signal period, a video signal and an on-screen signal are input to the changing over means;

a displaying device for displaying an output signal from the changing over means;

a projection lens for projecting light of an image from the displaying device on a screen;

moving means for moving said projection lens and making a zooming display possible;

position detecting means for detecting that the projection lens is placed on a zoom position and generating a detecting signal; and on-screen timing setting means for setting a display position of the on-screen signal by controlling a changing over timing of the changing over means and changing over the display position of the on-screen signal in accordance with a detecting signal from the position detecting means to display the on-screen signal within a displaying range at zooming.

According to the aforesaid structure, even if a zoom ratio of a lens is changed to change the picture image size on the projecting-type image displaying apparatus, image information can be displayed without lacking on-screen information on a projection screen.

BRIEF DESCRIPTION OF THE DRAWINGS

FIG. 2(a) and 2(b) is an explanatory diagram showing an example of zoom position detecting means in FIG. 1.

DETAILED DESCRIPTION OF THE PREFERRED EMBODIMENTS

Embodiments will be explained with reference to drawings.

Figure 1:
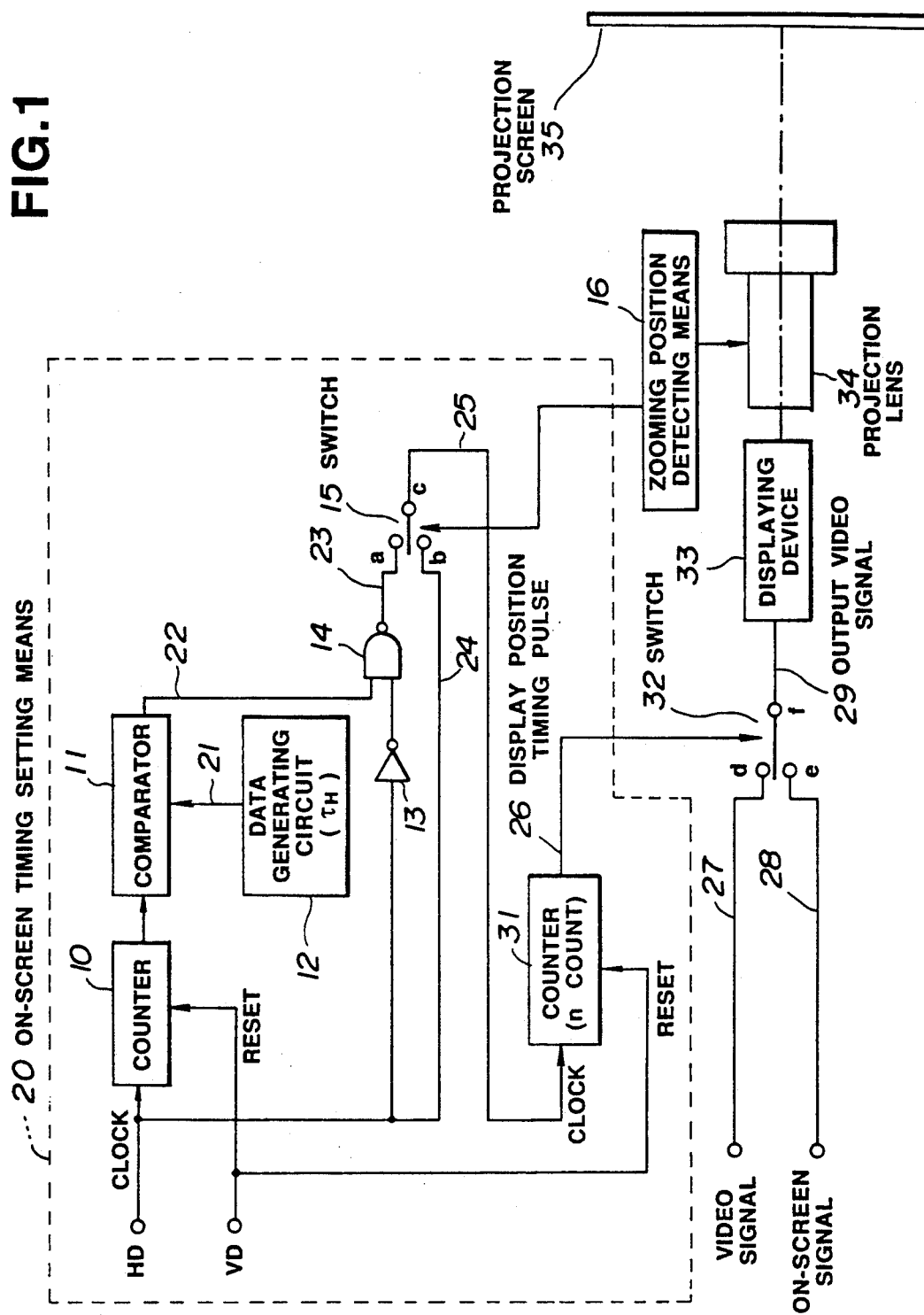
FIG. 1 is a block diagram showing an on-screen displaying circuit of an embodiment of the present invention.

FIG. 1 is a block diagram showing an on-screen displaying circuit of an embodiment of the present invention. FIGS. 2(a) and 2(b) are diagrams showing an example of the zoom position detecting means of FIG. 1. FIG. 1 shows the circuit structure which determines a display position of an on-screen signal in the vertical direction when an on-screen signal is displayed.

Figure 10:
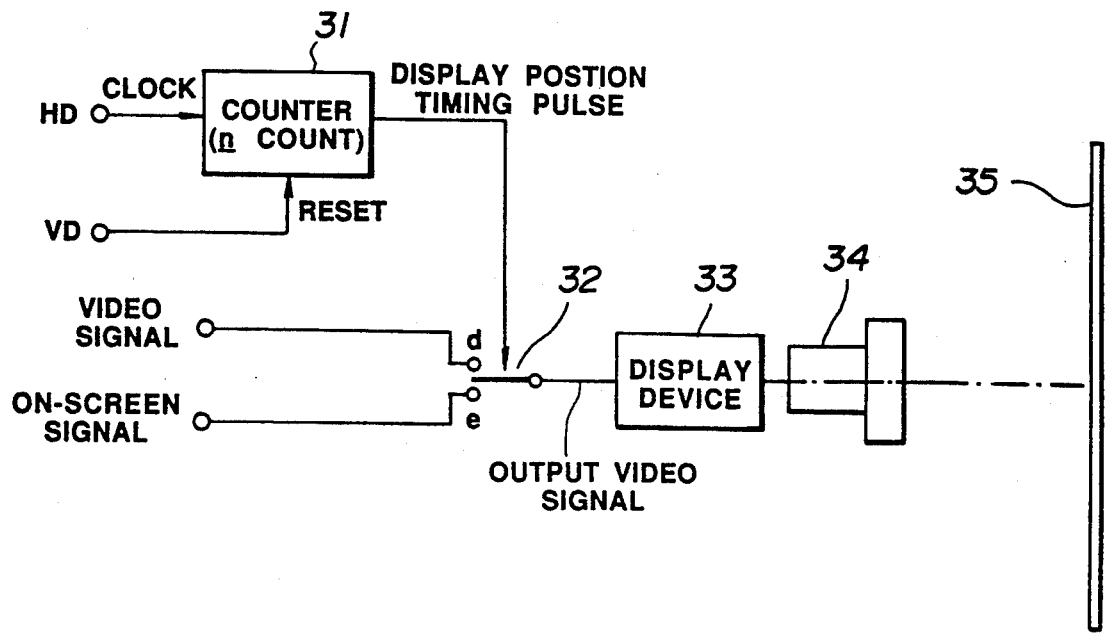
FIG. 10 is a block diagram showing the on-screen displaying circuit heretofore in use.

Further provided in FIG. 1, the reference numerals 31-35 are the same structure elements as those in the prior art (FIG. 10). In this embodiment, in addition to the structure of the numerals 31-35, it is zoom position detecting means 16, for detecting a zoom position of a projection lens 34, an on-screen timing setting means 20, for changing over a timing of an on-screen display position in accordance with a zoom position detecting signal produced by the detecting means 16.

First, the on-screen timing setting means 20 will be explained. Reference numeral 10 is a counter. A horizontal synchronizing signal HD and a vertical synchronizing signal VD are supplied to the counter 10 as a clock pulse and a reset pulse, respectively. The count output (an HD counting value) of the counter 10 is compared to a predetermined value (an HD counting value corresponding to a time width τH) from a data generating circuit 12 by a comparator 11. When the counting number of the counter 10 is smaller than a predetermined counting number corresponding to a time width τH from the data generating circuit 12, the comparator 11 outputs a low level signal. When the counting number of the counter 10 reaches the predetermined counting number, the comparator 11 outputs a high level signal. A comparative output of the comparator 11 and a signal in which a horizontal synchronizing signal HD is inverted at an inverter 13 are fed to a NAND circuit 14. The output of the NAND circuit 14 is fed to an input end a of a switch 15. The horizontal synchronizing signal HD is fed to the other input end b of the switch 15. The switch 15 switches the input ends a and b in response to the output of the zoom position detecting means 16. At a normal state, it is switched to the input end b side. At a zooming state (when a picture image size is zoomed in to make it larger than that of the normal state), it is switched to the input end a side. The output of the switch 15 can be obtained at an output end c.

The projection lens 34 is formed so that the position of the lens can be moved back and forth between a normal state and a zooming state. At the zooming state, the projection lens 34 is moved forward (the side of the projection screen 35) to a predetermined position (a zoom position).

The zoom position detecting means 16 detects the zoom position of the projection lens 34. For example, it detects that the projection lens 34 is located in a zoom position, which corresponds to a picture image size having the aspect ratio 16:9. As shown in FIGS. 2(a) and 2(b), the projection lens 34 consists of a lens movable portion 34a and a lens fixing portion 34b. The lens movable portion 34a moves along the lens fixing portion 34b. In other words, the lens fixing portion 34b is formed like a circular cylinder so as to slidably keep the lens movable portion 34a in the circular cylinder. A plate-like projecting portion 16a is fixed to the lens movable portion 34a. The projecting portion 16a is projected into the outside through a slit provided in the lens fixing portion 34b. A zoom position detecting switch 16b is arranged near the lens fixing portion 34b. The zoom position detecting switch 16b is activated when the lens movable portion 34a is moved to a zoom position (the position where the picture image size is enlarged). The zoom position detecting switch 16b is, for example, a micro switch. A terminal of the switch 16b is connected to a reference potential point and the other terminal (sliding terminal) is connected to a DC power line Vcc through a resistance 16c and connected to a control terminal of the switch 15. In FIGS. 2(a) and 2(b) the zoom position detecting means 16 includes 16a, 16b, 16c and Vcc. As shown in FIG. 2(a), a high level signal is supplied from the zoom position detecting means 16 to the switch 15 at a normal state because the switch 16b is off. As shown in FIG. 2(b), a low level signal is supplied from the zoom position detecting means 16 to the switch 15 at a zooming state because the switch 16b is on. The switch 15 is switched to the input end b side by a high level signal at a normal state and switched to the input end a side by a low level signal at a zooming state.

The output of the switch 15 is fed to a clock terminal of the counter 31. The vertical synchronizing signal VD is supplied to a reset terminal of the counter 31 as a reset pulse. The counter 31 counts the clock pulse from the switch 15. When it counts n, a display position timing pulse having a predetermined width is output. The output of the counter 31 controls the switching of a switch 32. The switch 32 has two input ends d and e to which a video signal and an on-screen signal are input, respectively. The output of the counter 31 is changed over to the input end d during the period of low level output from the counter 31, thereby supplying a video signal to an output end f. The output of the counter 31 is changed over to the input terminal e during the period of high level output to supply an on-screen signal to the output terminal f. Accordingly, the switch 32 selectively changes over from an input video signal to an on-screen signal within a vertical period so as to output a signal in which an on-screen signal is superimposed on a video signal. The output video signal from the switch 32 is then supplied to a displaying device 33. The image displayed on the displaying device 33 is enlarged and projected on the projection screen 35 through the projection lens 34.

Next, the operation of FIG. 1 will be explained with reference to FIGS. 3 and 4.

Figure 3:
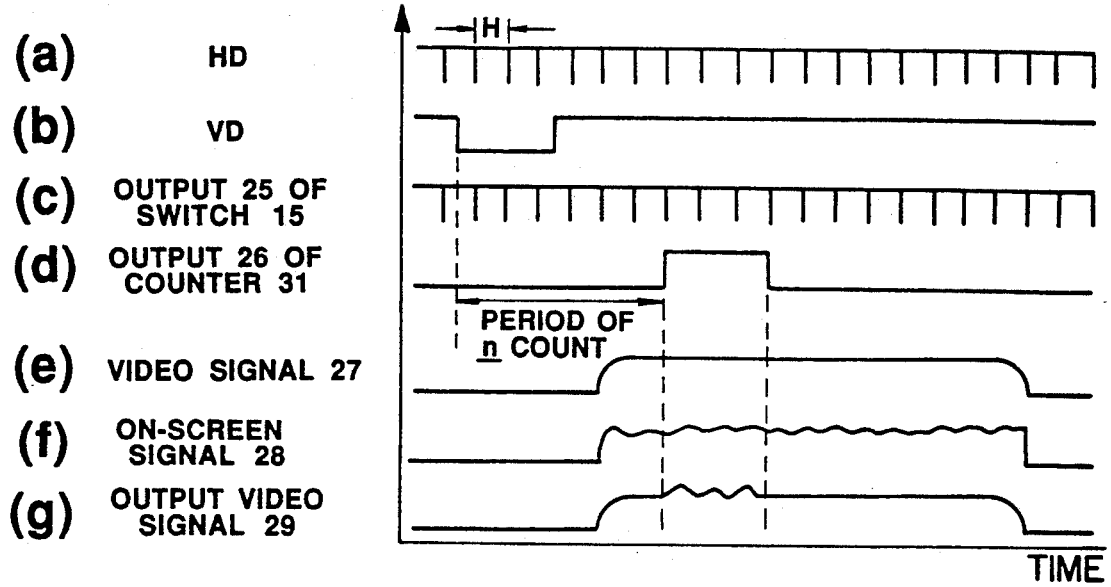
FIGS. 3 and 4 are charts explaining the operation in FIG. 1.

FIG. 3 is a timing chart at a normal state in FIG. 1.

Figure 4:
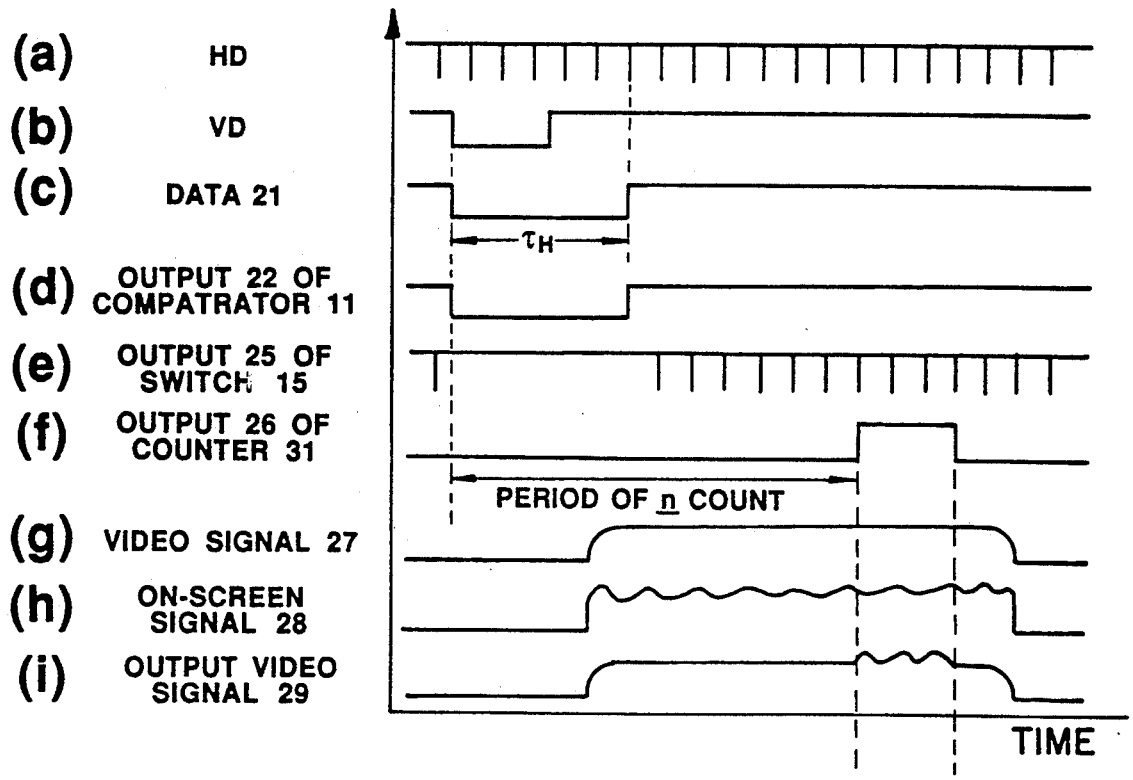

FIG. 4 is a timing chart at a zooming state in FIG. 1.

First, the operation at a zooming state will be explained with reference to FIG. 4.

In the counter 10, the horizontal synchronizing signal HD (see FIG. 4(a)) is counted by making the vertical synchronizing signal VD (see FIG. 4(b)) a reset pulse. The count output (an HD counting value) is then compared by the comparator 11 with an HD counting value corresponding to data 21 having a time width $\tau$ H (see FIG. 3B(c)). When the counter 10 outputs a count data (an HD counting value) corresponding to the time width $\tau$ H, an output 22 of the comparator 11 changes from, for example, a low level to a high level (see FIG. 4(d)). The output 22 and a signal which is obtained by inverting the horizontal synchronizing signal HD at the inverter 13 are then supplied to the NAND circuit 14. The inverter 13 and the NAND circuit 14 compose masking means for masking a part of the horizontal synchronizing signal HD for a period $\tau$ H by the output of the comparator 11. At this moment, the switch 15 is switched to terminal a by low level zoom position detecting signal from the zoom position detecting means 16. An output 25 of the switch 15 becomes a horizontal synchronizing signal in which a horizontal synchronizing signal HD is masked for the period $\tau$ H as shown in FIG. 4(e). The output 25 is supplied to the counter 31 as a clock pulse. The counter 31 outputs a display position timing pulse having a predetermined width (3H in the drawing, but H is a horizontal scanning period) after the counter 31 counts n clock pulse as in the prior art.

In the counter 31, although n clock pulse are counted, an output 26 of the counter 31 becomes a display position timing pulse delayed for the period $\tau$ H as shown in FIG. 4(f) because the input horizontal synchronizing signal 25 is masked for a period $\tau$ H as shown in FIG. 4(e). This display position timing pulse 26 is supplied to the switch 32 as a switch control signal. In the switch 32, a video signal 27 is selected (see FIG. 4(g)) from the input end d when the timing pulse 26 is in a low level period and the switch is changed over to the input end e when it is in a high level period. At that time, an on-screen signal 28 (see FIG. 4(h)) is selected. The display position timing of the on-screen signal 28 for the video signal 27 is determined by the timing pulse 26, so that a signal 29 is output from the switch 32 as shown in FIG. 4(i). The on-screen display position timing of the signal 29 is delayed for the period $\tau$ H in comparison with a normal state. By using the output video signal 29, on-screen information is moved in the vertical direction of the horizontal scanning number corresponding to the period $\tau$ H and displayed on the picture plane of the displaying device 33.

Accordingly, if the time width $\tau$ H of the data 21 from the data generating circuit 12 is suitably set in advance so as to relocate the on-screen display without compromising the picture image information at the time the projection lens 34 moves to a zoom position, the on-screen display position will automatically move in the vertical direction when the lens 34 is zoomed in, so that the entire on-screen display will be visible.

Figure 11:
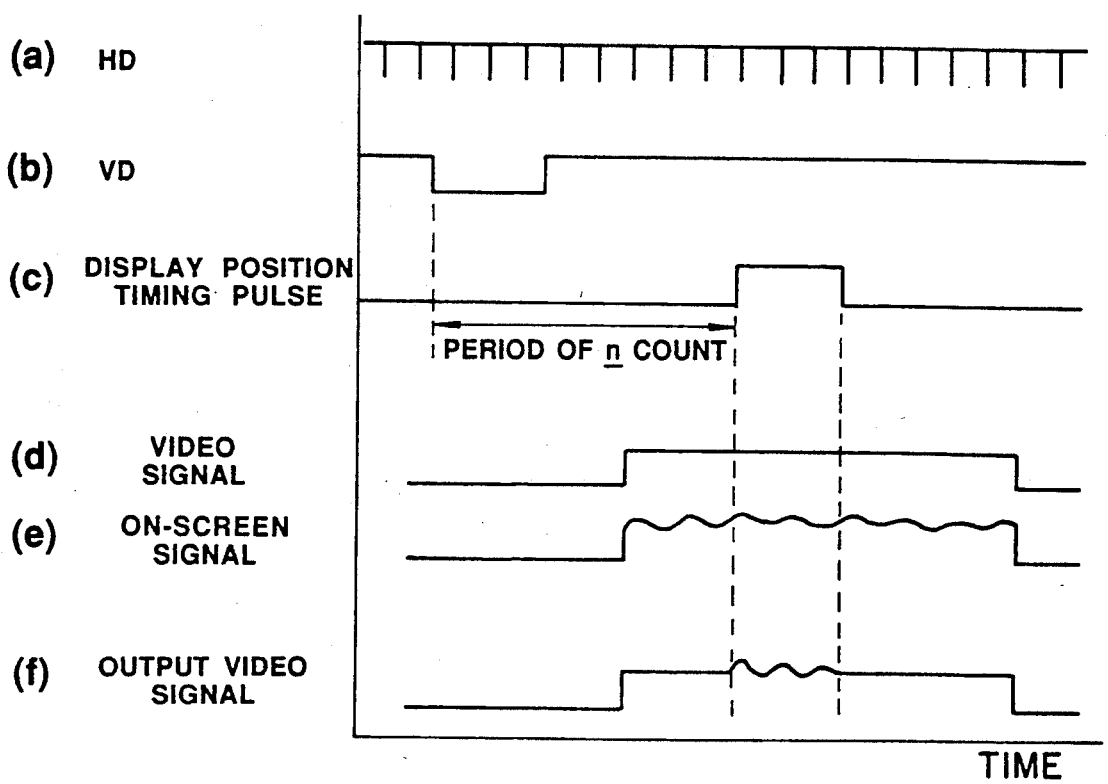
FIG. 11 is a timing chart explaining the operation in FIG. 10.
Figure 12A:
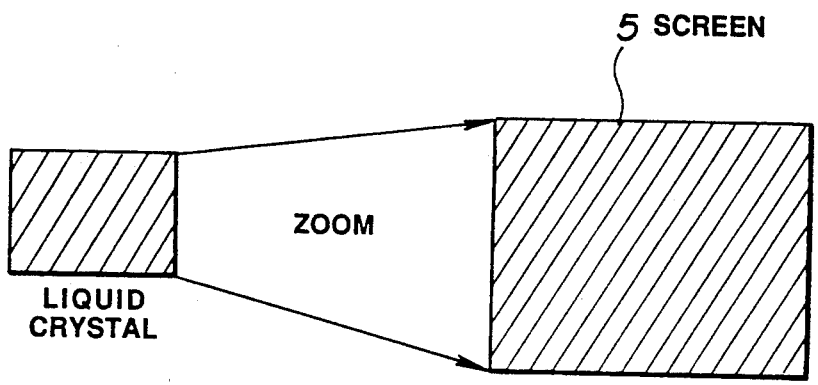
FIGS. 12(a) and 12(b) are explanatory diagrams when a projected image is enlarged and displayed in accordance with the aspect ratio of the displayed image in FIG. 10.
Figure 12B:
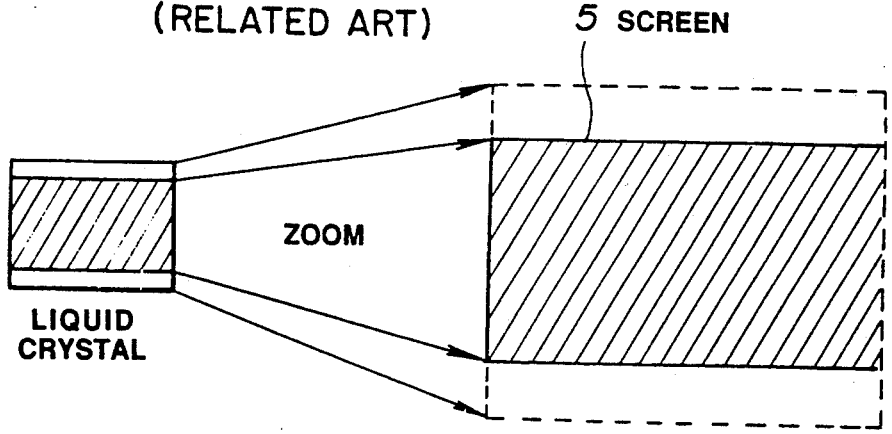
Figure 13A:
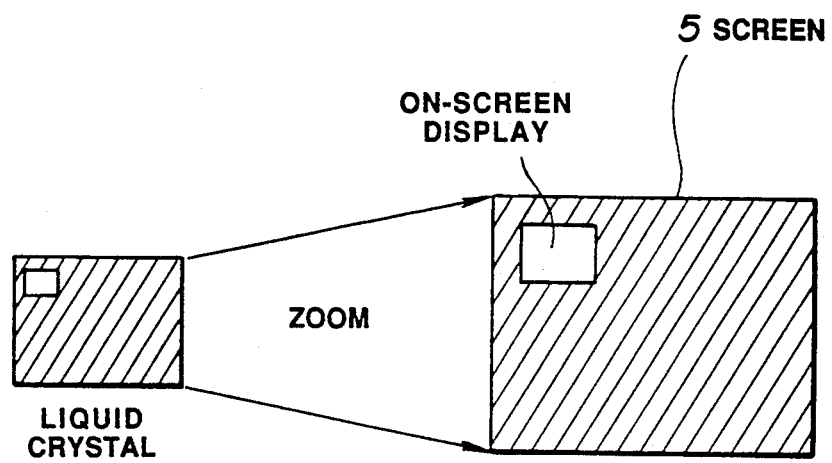
FIGS. 13(a) and 13(b) are diagrams explaining the inconvenience when a projected image is enlarged and displayed in accordance with the aspect ratio of the displayed image in FIG. 10.
Figure 13B:
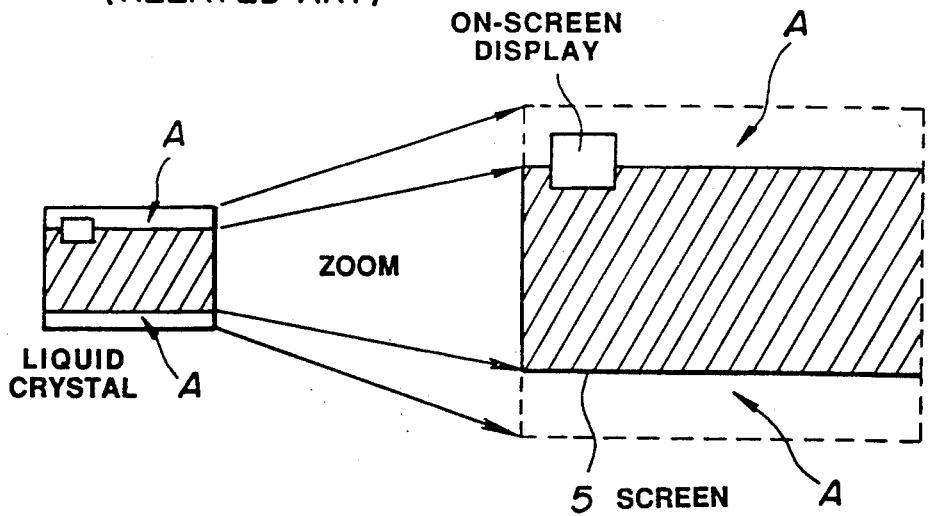

The operation at a normal state is shown as in FIG. 3. At this time, since the switch 15 is changed over to a terminal b side by a high level signal from the zoom position detecting means 16, this operation is the same as the operation (FIG. 11) of the prior art (FIG. 10).

In FIG. 3, (a) is a horizontal synchronizing signal HD input to the counter 10 as a clock pulse, (b) is a vertical synchronizing signal supplied to the counter 10 as a reset pulse and (c) is the output 25 of the switch 15 that becomes the horizontal synchronizing signal HD in (a) output as it is. (d) is the output 26 of the counter 31 that is a display position timing pulse having a predetermined width (3H in the drawing) output when n horizontal synchronizing signal HD is counted after the counter 31 is reset by the vertical synchronizing signal VD. (e) is a video signal 27, (f) is an on-screen signal 28 and (g) is an output video signal output from the switch 32 using the display position timing pulse in (d). In the output video signal, the on-screen signal 28 is superimposed onto the video signal 27.

Also, the display width in the vertical direction of the on-screen display can be selectively set by the pulse width output from the aforesaid counter 31.

Figure 5:
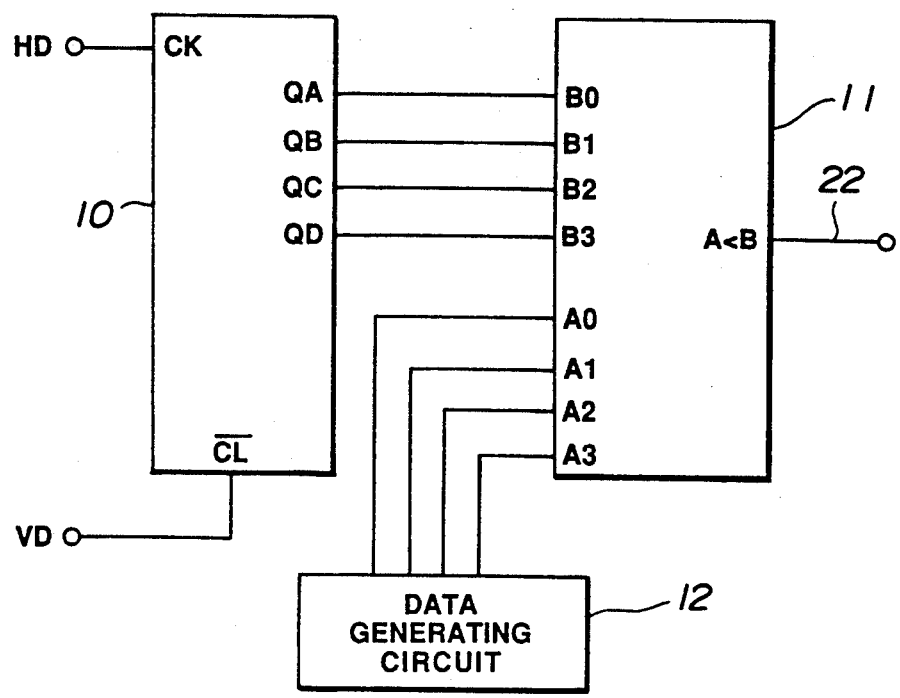
FIG. 5 is a diagram showing an example of the circuit structure for materializing a counter, a comparator and a data generating circuit in FIG. 1.
Figure 6:
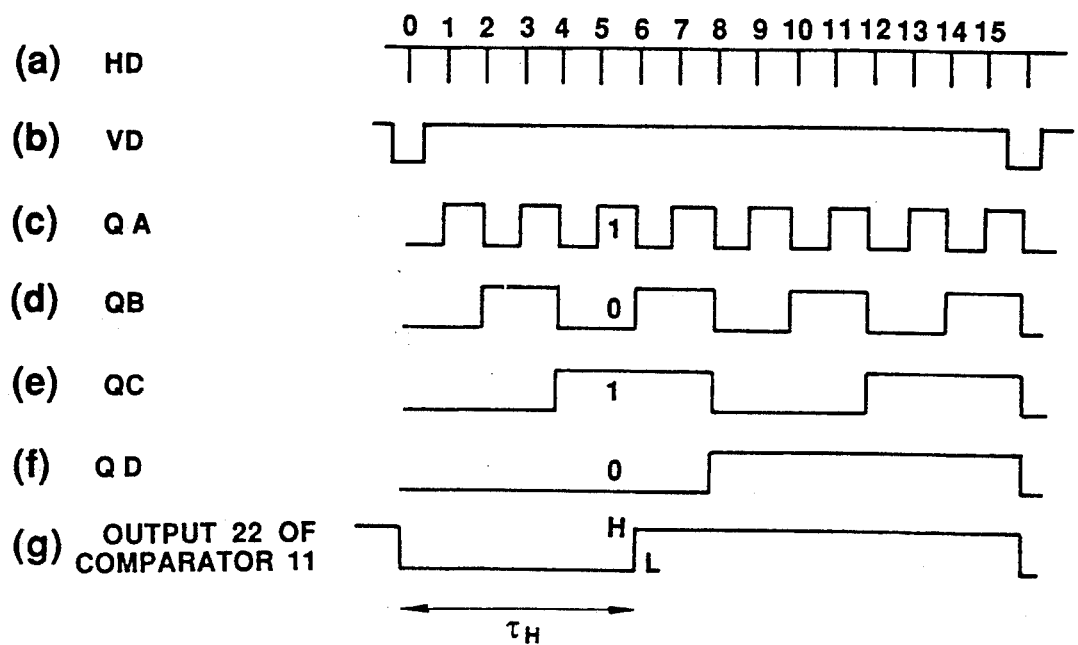
FIG. 6 is a timing chart explaining the operation in FIG. 5.

FIG. 5 shows an example of the circuit structure for the counter 10, the comparator 11 and the data generating circuit 12 in FIG. 1. FIG. 6 is a timing chart explaining the operation of FIG. 5.

In FIG. 5, the counter 10 is composed of a 4 bit hexadecimal counter, and the comparator 11 and the data generating circuit 12 are composed of 4 bits corresponding to the counter 10. For example, an IC TC74HC 163, the product of Kabushikikaisha Toshiba is used as the counter 10 and a TC74HC85 is used as the comparator 11. The counter 10 has a clock terminal CK to which a horizontal synchronizing signal HD is input, a reset terminal $\overline{CL}$ to which a vertical synchronizing signal VD is input and counter output terminal Q (QA–QD). The comparator 11 has an input terminal B (B0–B3) to which the output of the counter 10 is supplied, an input terminal A (A0–A3) to which a predetermined value is supplied from the data generating circuit 12, and an output terminal (A<B) in which a comparative output of a high level (H) or low level (L) is obtained. The data generating circuit 12 provides a predetermined high level (H) or low level (L) signal to the terminals A0–A3 of the comparator 11. In this example, A3 A2 A1 A0 is 0101 (=5).

In the timing chart of FIG. 6, (a) is a horizontal synchronizing signal HD, (b) is a vertical synchronizing signal VD, (f)–(c) are the outputs of the counter 10 (QD–QA are equal to the inputs B3–B0 of the comparator 11) and (g) is the output 22 of the comparator 11. When the outputs QD–QA of the counter 10 are 0101 and less, the comparator output 22 becomes a low level (L). When the outputs QD–QA of the counter 10 are more than 0101, the comparator output 22 becomes a high level (H). Therefore, the time width τH is determined by setting values of the comparator input values A3−A0.

In FIG. 4, the counter 10 is composed of 5 bit hexadecimal counter, and the comparator 11 and the data generating circuit 12 correspond to these 4 bits. If the counter 10 is composed of an 8 bit counter for counting up to 256, and the comparator 11 and the data generating circuit 12 correspond to 8 bits, the counter 10 can be applied to a liquid crystal picture plane having numerous horizontal scanning lines.

In the aforesaid embodiment, the position of an on-screen display in the vertical direction is changed over. However, this invention can be applied as easily to the case where a position of an on-screen display in the horizontal direction is changed over.

Figure 7:
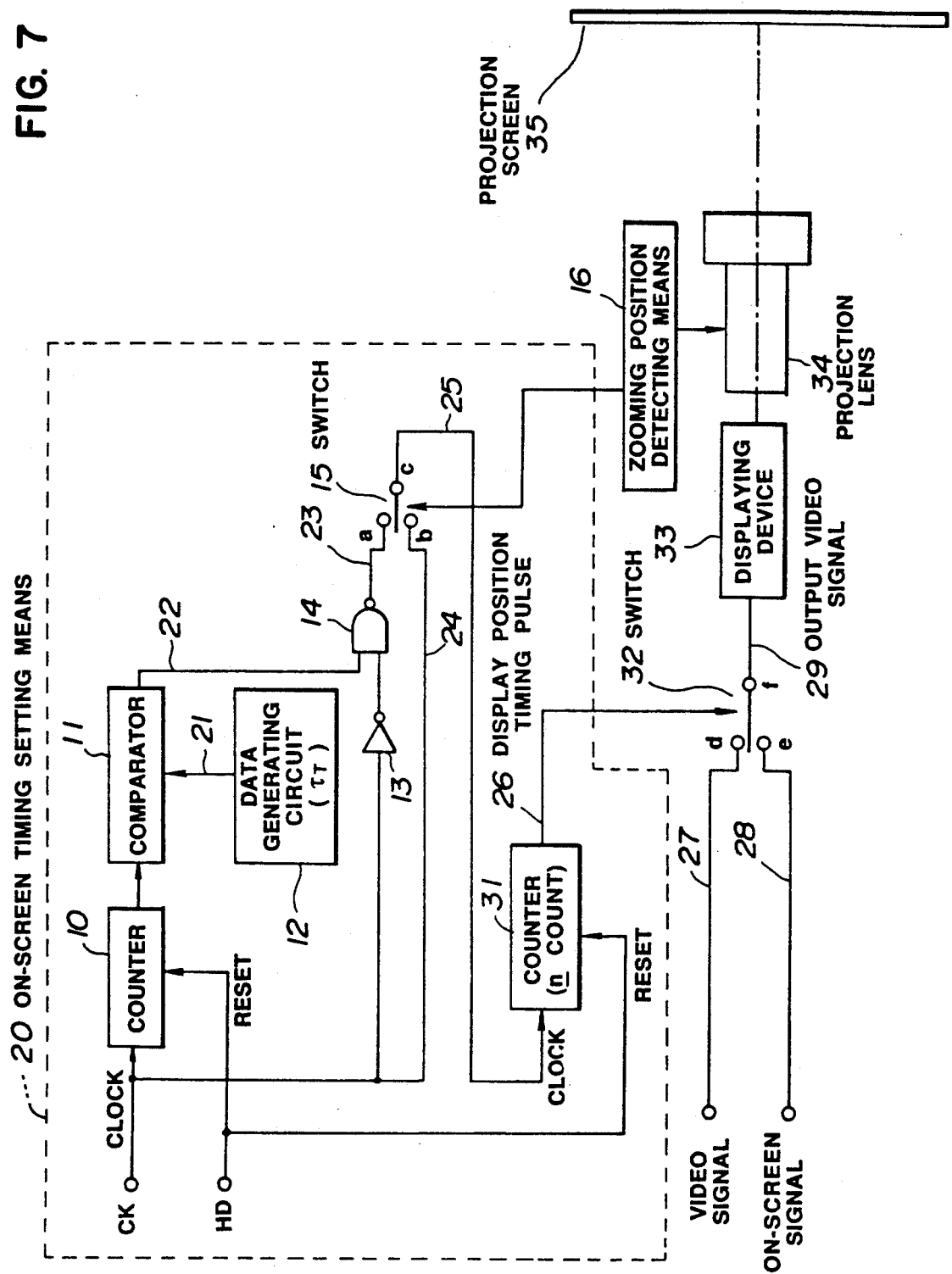
FIG. 7 is a block diagram showing an on-screen displaying circuit in another embodiment of the invention.
Figure 8:
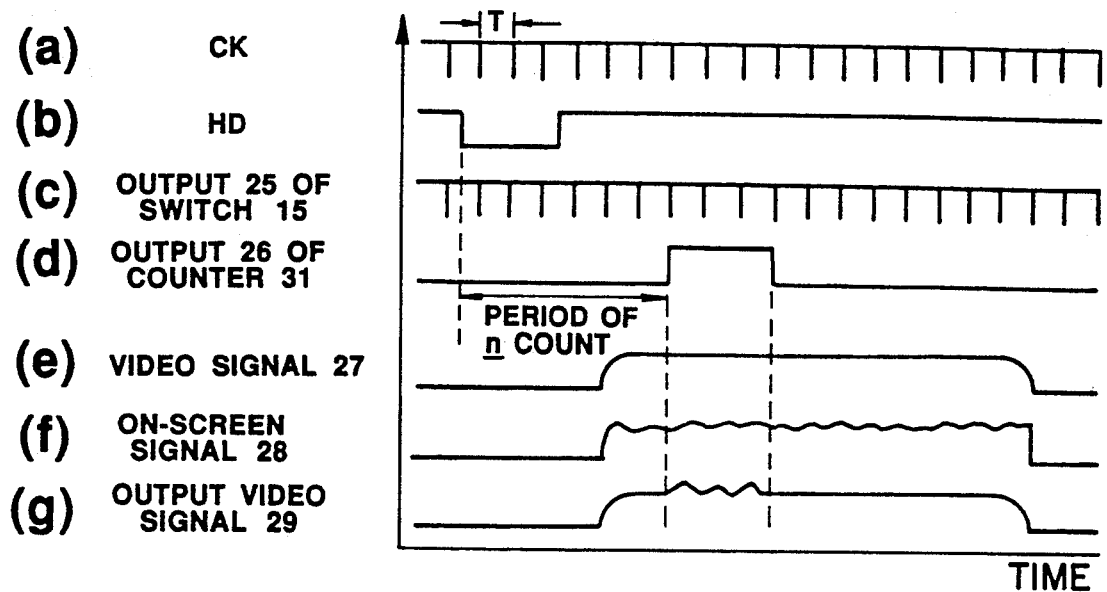
FIGS. 8 and 9 are timing charts explaining the operation in FIG. 7.
Figure 9:
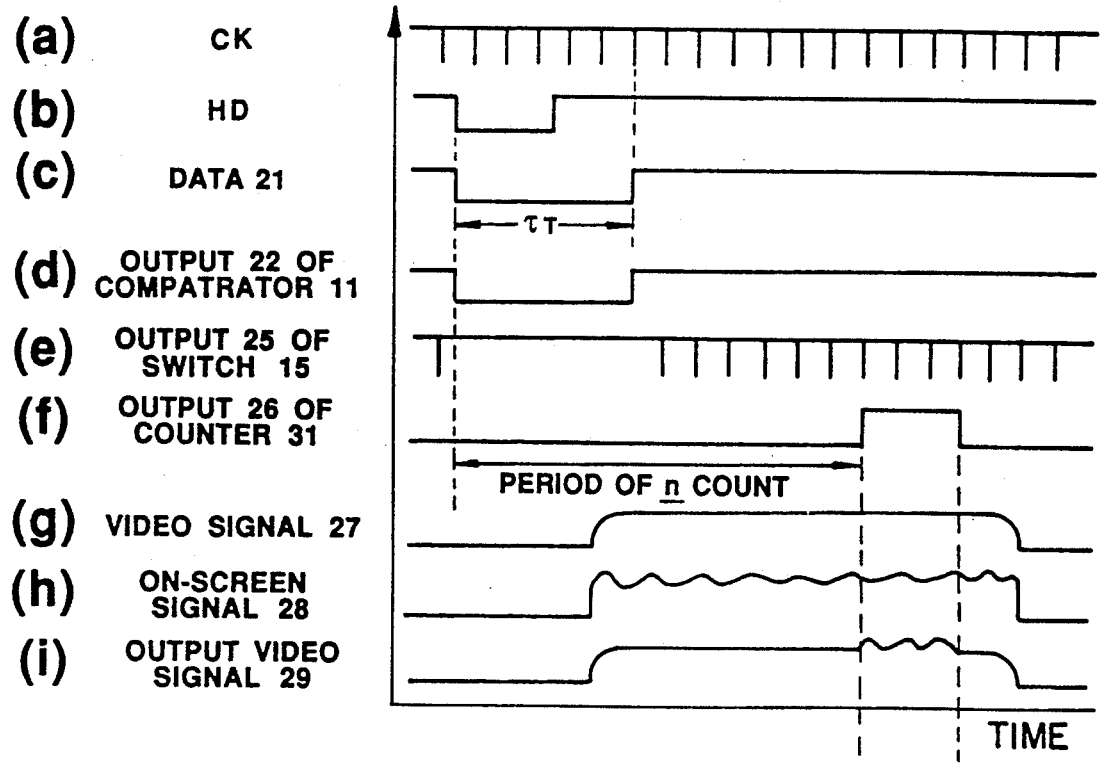

FIG. 7 is a block diagram showing an on-screen displaying circuit of another embodiment of the invention. The circuit shown in FIG. 7 denotes the circuit structure which determines a display position of an on-screen signal in the horizontal direction. FIGS. 8 and 9 are timing chart explaining the operation of FIG. 7. FIG. 8 is a timing chart at a normal state. FIG. 9 is a timing chart at a zooming state.

Because the circuit structure in FIG. 7 is the same as the structure in FIG. 1, the same reference numerals are given to the same structure elements in FIG. 1. Since the structure elements are the same as those in FIG. 1, explanation is omitted. The differences of FIG. 7 from FIG. 1 are the; use of a clock CK, having a predetermined frequency (cycle T) corresponding to a horizontal display position, as a clock pulse used in the counters 10 and 31, and to use a horizontal synchronizing signal HD as a reset pulse. Also, data generating circuit 12 outputs a data 21 for delaying the on-screen display for a constant period while τT in a horizontal scanning period at a zooming state and supplies the data 21 to a comparator 11. A switch 15 is changed over to the terminal a by a zoom position detecting signal from a zoom position detecting means 16 so that a clock CK, including a mask period τT, is output as a switch output 25. A counter 31 makes a horizontal synchronizing signal HD a reset pulse and outputs a timing pulse 26 having a predetermined width which determines the timing of an on-screen display in the horizontal direction after counting n clock CK from the switch 15. Accordingly, the display timing pulse 26 is delayed for a period τT while in a normal state and output, so that the display position of the superimposed on-screen signal 28 can be moved in the horizontal direction on the picture plane for the number of clock pulse (CK) during the period τT.

The timing charts of FIGS. 8 and 9 are identical to that of FIG. 3 except that (a) is a clock CK having the cycle T, corresponding to the horizontal display position, and (b) is a horizontal synchronizing signal HD. Thus, the explanation is omitted.

Thus to the present invention as the aforesaid, a zoom position of a projection lens is detected (that is, the picture image size is detected) and a display position timing (the position on the picture plane) of a superimposed on-screen signal is changed over in accordance with the detecting signal to set the display position timing. Therefore, when video image software having an aspect ratio of 16:9 is used an on-screen signal displayed with an aspect ratio of 16:9 can be moved and displayed in the picture plane having a ratio of 16:9. When the on-screen signal is enlarged and projected onto the 16:9 projection screen, the on-screen information can be displayed without lacking the on-screen information.

Also, this invention is not restricted only by the aforesaid embodiments and transformations different in a wide range can be formed without departing from the scope of the invention.

What is claimed is:

1. An on-screen displaying system capable of superimposing a secondary video picture, represented by an on-screen signal, onto a main video picture, represented by a video signal, comprising:

means for receiving said video signal and said on-screen signal;

means for selectively outputting said on-screen signal in a predetermined period within a period of said video signal;

means for displaying an output signal from said outputting means;

a projection lens projecting light of an image from said displaying means;

means for moving said projection lens in order to change a size of said image projected;

means for detecting a position of said projection lens and generating a detecting signal related thereto; and on-screen timing setting means, responsive to said detecting signal, for controlling a timing at which said outputting means outputs said on-screen signal within said video signal so as to shift a position of a display of said on-screen signal relative to a display of said video signal so as to maintain the display of said on-screen signal within said image on said screen during enlarging.

2. The on-screen displaying system according to claim 1 wherein said lens position detecting means includes:

a switch which is activated when said projection lens is moved to an enlarging; and means for generating an enlarging position detecting signal in response to the activation of said switch.

3. The on-screen displaying system according to claim 1 wherein said on-screen timing setting means includes:

a first counter for counting a horizontal synchronizing signal, wherein a vertical synchronizing signal is used as a reset pulse;

a comparator for comparing an output of said first counter with a predetermined value and outputting a mask signal corresponding to a period in which said first counter output exceeds the predetermined value;

masking means for masking a predetermined period of said horizontal synchronizing signal by the mask signal from said comparator;

a selection switch for selectively outputting one of said horizontal synchronizing signal and a horizontal synchronizing signal output from said masking means, said switch selecting the output from said masking means when said lens position detecting means detects that the lens is in an enlarging position; and a second counter for counting said horizontal synchronizing signal output from said selection switch and, when a predetermined number is reached, supplying a timing signal indicating said position of the on-screen signal display to said outputting means, wherein said vertical synchronizing signal is used as a reset pulse.

4. The on-screen displaying circuit according to claim 1 wherein said on-screen timing setting means includes:
 a first counter for counting a clock signal of a predetermined frequency, said clock signal corresponding to a horizontal display position of said on-screen signal by making a horizontal synchronizing signal a reset pulse;
 a comparator for comparing an output of said first counter with a predetermined value and outputting a mask signal corresponding to a period in which an output from said first counter exceeds the predetermined value;
 masking means for masking a predetermined period of said clock signal by the mask signal from said comparator;
 a selection switch for selectively outputting one of said clock signal and a clock signal output from said masking means, said switch selecting the clock signal from said masking means when said lens position detecting means detects the lens is an enlarging position; and
 a second counter for counting the clock signal output from said selection switch and, when a predetermined number is reached, supplying a timing signal indicating said position of the on-screen signal display to said outputting means, wherein said horizontal synchronizing signal is used as a reset pulse.

* * * * *